Dec. 25, 1923.　　　　　A. J. PUKT　　　　　1,478,398
FLEXIBLE COUPLING
Filed March 30, 1923
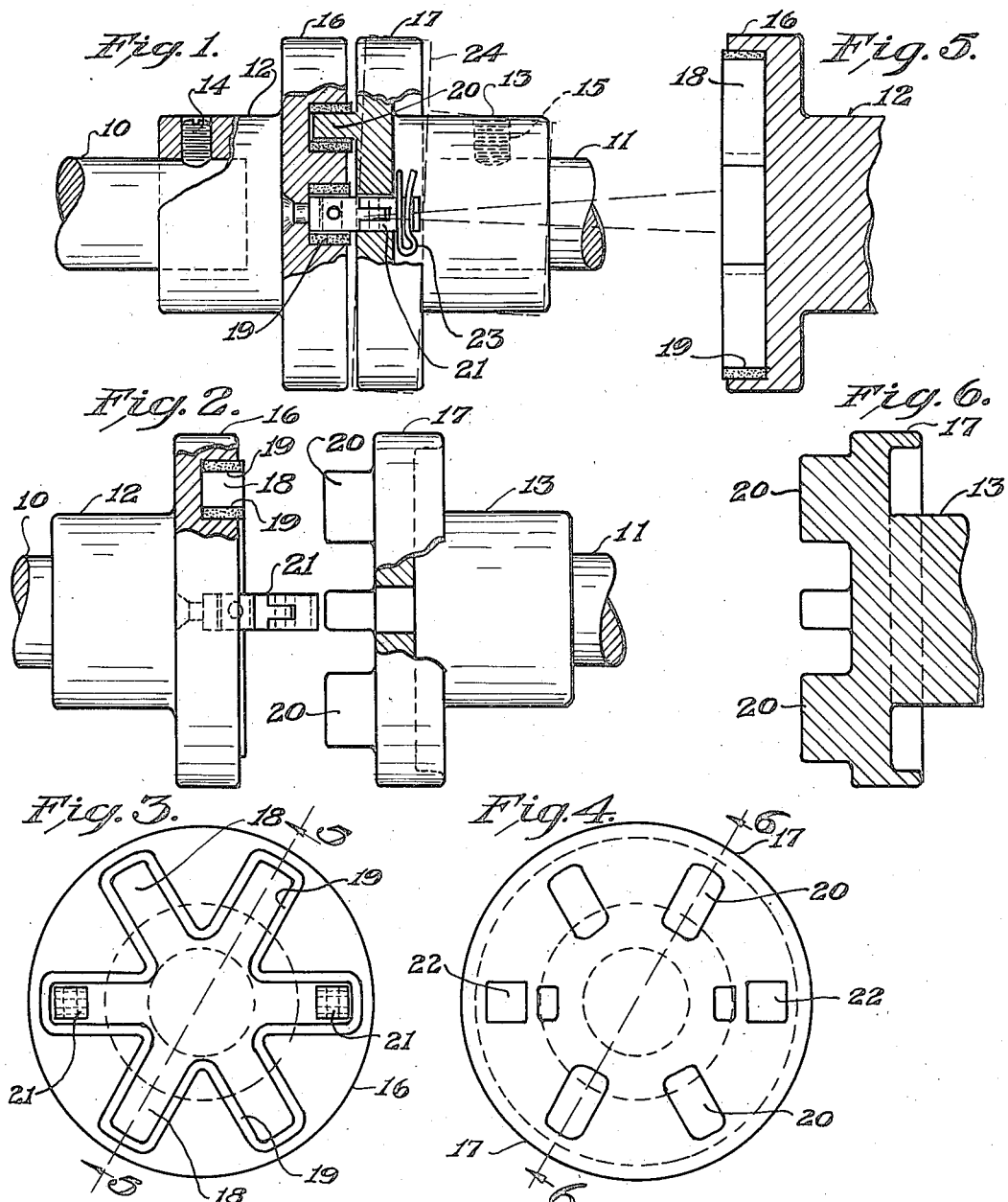
Inventor
Albert J. Pukt
per
Clarence A. Benedict
Attorney.

UNITED STATES PATENT OFFICE.

ALBERT J. PUKT, OF SOUTH BOSTON, MASSACHUSETTS.

FLEXIBLE COUPLING.

Application filed March 30, 1923. Serial No. 628,753.

*To all whom it may concern:*

Be it known that I, ALBERT J. PUKT, a citizen of the United States, residing at South Boston, in the county of Suffolk, in the State of Massachusetts, have invented a certain new and useful Improvement in Flexible Couplings, of which the following is a specification, reference being had to the accompanying drawings.

This invention relates to couplings for power transmission shafts of the so-called flexible type; and it has for its object to provide a simple and effective method of coupling shafts that are not in proper alinement, and also to take care of any angularity that may be caused by wear or incorrect adjustment during operation of coupled shafts. A further object of the invention is to provide a coupling that can be quickly disconnected and also eliminate a large amount of the noise that generally exists in universal couplings.

With this desirable object in view, I have provided the accompanying drawing in which Figure 1 is a side view of the coupling in a coupled position. Figure 2 is a side view of the coupling in an uncoupled position. Figure 3 is an end view of the female member of the coupling. Figure 4 is an end view of the male member of the coupling. Figure 5 is a sectional view on the line 5—5, Figure 3. Figure 6 is a sectional view on the line 6—6, Figure 4.

Corresponding parts in the several figures are denoted by like characters of reference. The shafts 10 and 11 are any power transmission shafts that may be desired to be coupled together. The shafts 10 and 11 are fastened to the coupling bodies 12 and 13 in the common manner by the set screws 14 and 15; the coupling bodies are enlarged to form the flange like portion 16 which has a series of cored openings 18, the sides of said openings 18 being lined 19 with any tough resilent material such as leather, cowhide, etc.

The flanged like portion 17 has a series of protruding portions 20 which are so arranged to enter the lined cored openings 18 in the flange like portion 16.

Attached to the flange like portion 16 in any approved manner are the flexible chain like connectors 21, which are so constructed as to extend through the cored openings 22 in the flanged like portion 17 and protrude sufficiently to secure with the cotter pins 23 as shown or in any such securing device.

The flange like portion 16 constructed as shown forms the female member of the coupling.

The flange like portion 17 constructed as shown forms the male member of the coupling.

In practice, the improved device is applied to the shafts as shown and owing to the interlocking members 20 and 18 the shafts 10 and 11 are positively connected for rotation and the protruding portions 20 bearing against the lining 19 of the cored openings 18 it can readily be seen that the flanged like portions 16 and 17 are not required to surfacely parallel each other and can therefore take care of any slight untrueness or angular difference in the shafts alinement as shown by the dotted lines 24 Figure 1.

Having now fully described my invention what I claim:

A flexible coupling of the type herein described the combination of a male coupling member with a series of protruding parts for rotating engagement with a female coupling member having a series of cored openings lined with resilient material said male and female coupling members being held in engagement by flexible chain like connectors substantially as described.

ALBERT J. PUKT.